(12) United States Patent
Hassell

(10) Patent No.: US 6,185,832 B1
(45) Date of Patent: Feb. 13, 2001

(54) APPARATUS AND METHOD FOR CALIPERING BOOK SIGNATURES

(76) Inventor: Robert J. Hassell, 10120 Twin Springs Rd., Bon Aqua, TN (US) 37025

( * ) Notice: Under 35 U.S.C. 154(b), the term of this patent shall be extended for 0 days.

(21) Appl. No.: 09/136,383

(22) Filed: Aug. 19, 1998

(51) Int. Cl.[7] ................................................. G01B 21/08
(52) U.S. Cl. .............................. 33/783; 33/711; 33/747
(58) Field of Search ............................... 33/783, 501.02, 33/501.03, 501.04, 711, 734, 747, 832, 833, 589, 555, DIG. 2, 815; 73/159

(56) References Cited

U.S. PATENT DOCUMENTS

| | | | |
|---|---|---|---|
| 2,848,816 | * | 8/1958 | O'Neill ............................. 33/501.04 |
| 3,191,925 | | 6/1965 | McCain . |
| 3,528,002 | * | 9/1970 | Dunlavey .......................... 33/501.03 |
| 3,581,402 | * | 6/1971 | London et al. .................... 33/501.03 |
| 3,622,147 | | 11/1971 | Mebus . |
| 3,627,303 | | 12/1971 | Zeewy . |
| 4,121,716 | * | 10/1978 | Luperti et al. .................... 33/501.03 |
| 4,121,818 | | 10/1978 | Riley . |
| 4,136,454 | * | 1/1979 | Jenkins et al. .................... 33/501.03 |
| 4,621,757 | | 11/1986 | Osako . |
| 4,741,109 | * | 5/1988 | McCurdy et al. ................. 33/501.03 |

FOREIGN PATENT DOCUMENTS 2-168107 * 6/1990 (JP) .................................. 33/501.03

* cited by examiner

*Primary Examiner*—Andrew H. Hirshfeld
(74) *Attorney, Agent, or Firm*—Kilpatrick Stockton

(57) ABSTRACT

Calipering the thickness of individual books during production, independent of caliper bounce due to elastic resiliency of the books. A caliper roller is held apart from an anvil roller while a book is positioned between the two rollers. The caliper roller then is moved toward the anvil roller with sufficient resilient force to cause an initial maximum compression of the book between the caliper elements, followed by rebound movement of the caliper roller. The initial movement of the caliper roller is coupled to a measuring element through a lost-motion connection, so that the measuring element is not affected by rebound movement of the caliper roller. Movement of the measuring element thus corresponds to the initial maximum compression of the book by the caliper roller, which in turn corresponds to the actual thickness of that book.

13 Claims, 7 Drawing Sheets

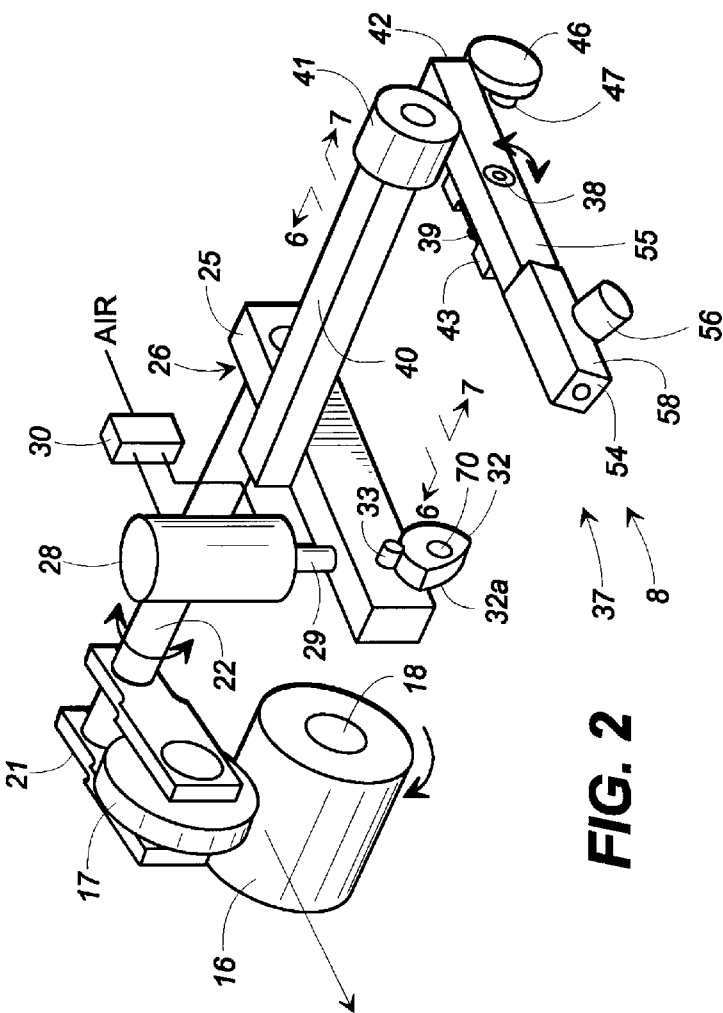
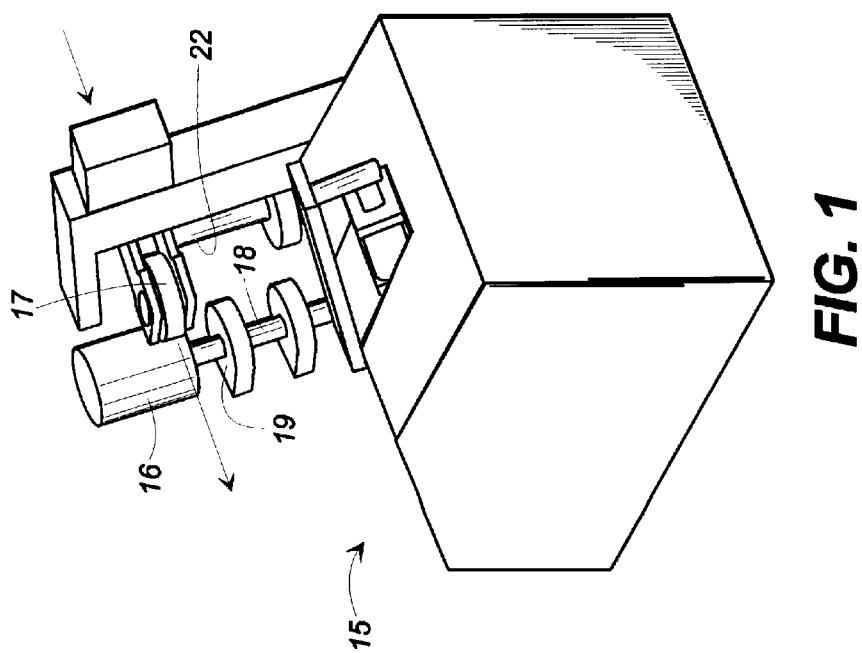
FIG. 2
FIG. 1

APPARATUS AND METHOD FOR CALIPERING BOOK SIGNATURES

FIELD OF THE INVENTION

This invention relates in general to manufacturing magazines and similar publications, and relates in particular to a calipering apparatus and method for determining the completeness of each magazine by measuring the thickness of each signature group.

BACKGROUND OF THE INVENTION

Magazines and similar publications are manufactured by assembling individual page sets, known as signatures, into a group of signatures known as a book. This assembly takes place on a chain conveyor having a number of pockets that move in turn past signature feeders, each containing a different signature for the book being assembled. Signatures are fed to each chain station from some or all signature feeders, depending on the composition of a particular magazine. The resulting book, or group of signatures, then is trimmed and stapled to complete the magazine. Individual signature feeders may be selectively actuated as each chain station passes that feeder, so as to customize the contents of each assembled magazine according to subscriber information or other data known to the printer. The foregoing and related details of magazine production are known to those skilled in the art.

It is important that each assembled book contain the proper number and selection of signatures. If a particular magazine contains more than the intended number of signatures, that magazine wastes the resources of the printer or publisher and also may appear defective to readers. If a magazine contains fewer signatures than desired, readers likely will detect the missing pages and any advertisers on those pages are entitled to compensation from the printer or publisher of the defective magazine. In either case, printers usually measure the thickness of each book assembled pocket of the chain conveyor, to determine whether that book contains the appropriate number of pages. Books that are thicker or thinner than appropriate are diverted from the remaining steps of the assembly operation.

Books of signature groups usually are calipered while moving along the chain by passing each book between a pair of rollers. The rollers compress the pages making up one side of the book, so that the spacing between the rollers is determined by the thickness of the book, that is, by the number of signatures in that book.

Such books are known to have an amount of resilience or elasticity, depending on variable factors such as the number of signatures in the group, the weight of the various signatures making up that group, atmospheric conditions (which may change during a printing run) in the printing plant, and other factors. This resiliency causes the caliper rollers to undergo a degree of bounce relative to each other, as the leading edge of each book enters the nip between the rollers. To avoid an erroneous thickness indication by the caliper, it has been customary to delay measuring the spacing between caliper rollers for a time sufficient to allow this resilient bounce to settle out. Because the amount of dwell time between the caliper rollers for each book is inversely related to the linear travel speed of the chain conveyor carrying the books, the maximum becomes limited as the dwell time diminishes to the minimum time required for the moveable caliper roller to settle out from the bounce induced by the arrival of each book and the elasticity inherent in that book. This limitation on the chain speed limits the throughput, and thus the efficiency, of manufacturing magazines or the like.

SUMMARY OF THE PRESENT INVENTION

Accordingly, it is an object of the present invention to provide an improved method and apparatus for calipering books of signature groups.

It is another object of the present invention to caliper such books without regard to the amount of bounce induced by the resilience of the book.

It is a further object of this invention to provide an apparatus and method for calipering such books without requiring any dwell time for settling the bounce of a movable caliper element.

It is still another object of the present invention to provide a more efficient technique for calipering books.

Other objects and advantages of the present invention will become apparent from the following description.

Stated in general terms, a book is calipered according to the present invention by maintaining the caliper elements mutually spaced apart while the book first moves between those elements. At least one caliper element then moves toward the other caliper element so as to compress the book between the caliper elements. The resilient force applied to close the caliper elements causes an initial maximum compression of the book between the caliper elements, followed by a rebound from that maximum compression in response to the resilience of the book. However, instead of waiting for the rebounding movement to settle out as in the prior art, the minimum distance between the caliper elements is sensed. That minimum spacing occurs as the caliper elements initially reach maximum compression of the book, before resiliently bouncing from that minimum spacing. This minimum spacing is a function of the thickness of the book between the caliper elements. Any subsequent rebound or bounce of the caliper elements from that initial maximum compression of the book is disregarded in sensing the minimum spacing between the caliper elements.

Stated in somewhat more detail, the caliper elements comprise a pair of mutually-opposed rollers mounted on opposite sides of the path traveled by the books. The axis of one roller is selectively moveable relative to the axis of the other roller so as to selectively separate the caliper rollers. As a book approaches the caliper rollers, the moveable roller is separated from the fixed roller to allow the book to enter the space between the rollers. Once the book arrives in that space, the moveable roller is urged to close toward the other roller, thereby engaging and initially compressing the moving book between the caliper roller to a maximum extent determined by the thickness of that book. This closing movement of the one roller displaces a measuring element in proportion to the closing movement of the roller during that initial compression. However, the bounce or rebound movement of the roller from that initial compression is decoupled from the measuring element, which remains at a state indicating the maximum closing travel of the measuring roller during initial compression of the book. A sensor associated with the measuring element is responsive to that state, producing a signal for comparison with a reference signal corresponding to the nominal or desired thickness for that particular book.

Stated in further detail, the moveable caliper roller is selectively urged toward the fixed roller by a resilient force, but the actual closing movement of the moveable roller preferably is initially restrained and then released. Upon that release, the roller undergoes a sudden closing movement with sufficient force to produce the desired maximum compression of the book, and the resilient nature of that force permits the movable roller to rebound from that maximum compression. A lost-motion link couples the closing movement of the moveable roller to the measuring element, and that element preferably is restrained from undergoing return displacement when the moveable roller undergoes resilient bounce. After the maximum displacement of the measurable element is sensed, that element and the moveable roller are restored to their initial positions to await arrival of the next book between the caliper rollers.

BRIEF DESCRIPTION OF DRAWINGS

FIG. 1 is a pictorial view of a caliper according to a preferred embodiment of the present invention.

FIG. 2 is a semischematic view showing details of the caliper assembly in the embodiment of FIG. 1.

DETAILED DESCRIPTION OF PREFERRED EMBODIMENT

Figure 3:
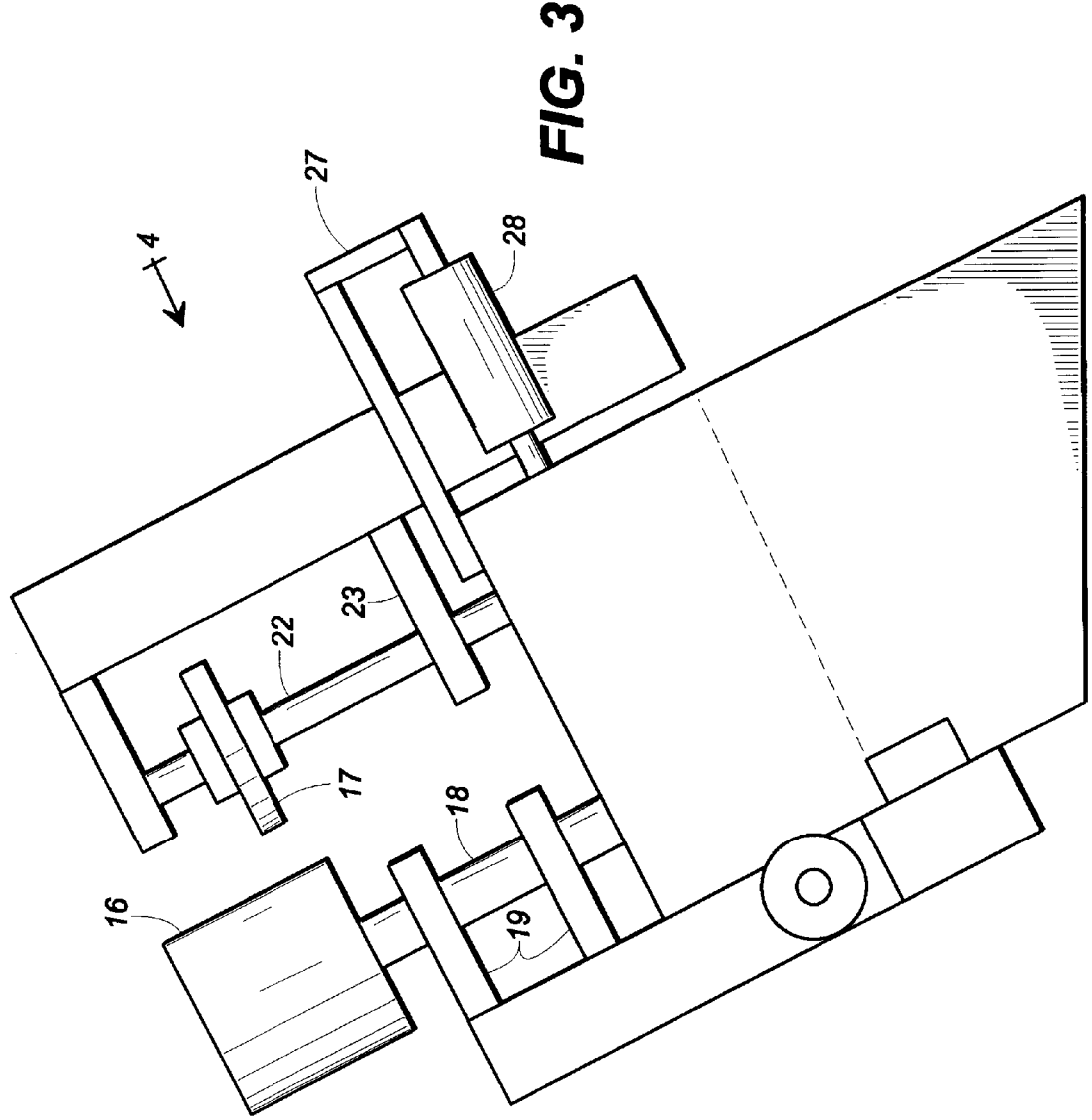
FIG. 3 is an elevation view taken from the left side of FIG. 1.

Turning first to FIG. 1, there is shown generally at 15 a caliper apparatus for measuring the thickness of books of signature groups. The caliper apparatus 15 includes an anvil roller 16 and a caliper roller 17 mounted in mutual opposition. The caliper apparatus 15 in use is located adjacent a chain conveyor (not shown) downstream from the final signature feeder in the conventional manner, so that the chain conveyor passes each assembled book in turn between the anvil roller 16 and the caliper roller 17. The anvil roller 16 is connected to a side shaft 18 supported by bearings 19 and rotated in synchronism with the chain conveyor so that the peripheral speed of the anvil roller is substantially the same as the linear velocity of books passing between that roller and the caliper roller 17.

The nature and operation of the caliper apparatus 15 is better understood with reference to FIG. 2, which shows details of that apparatus in semischematic form. The caliper roller 17 is mounted for rotation at the remote end of a pivot arm 21 extending radially outwardly from a pivot shaft 22. The near end of that pivot arm is attached to the pivot shaft 22 which is supported by a bearing 23 (FIG. 3) and extends to engage one end 25 of a pressure arm 26. The pressure arm 26 also extends radially from the pivot arm 21.

An air cylinder 28 is positioned adjacent the remote end of the pressure arm 26, and the piston rod 29 of the air cylinder extends downwardly for attachment to the pressure arm. The geometry of the connection between the pressure arm 26, the pivot arm 21, and the caliper roller 17 is chosen so that when the piston rod 29 is retracted, the caliper roller 17 is moved apart from the anvil roller 16, a condition shown in FIG. 3. However, when the air cylinder 28 is operated to extend the piston rod 29, the caliper roller 17 is urged to move toward the anvil roller 16. The air cylinder 28 is extended or retracted in response to an air control valve 30, as discussed below That movement of the pressure arm 26 is selectively restrained by engagement of the cam 32 located on one side on the remote end of the pressure arm 26. The surface of the cam 32 interacts with a cam follower 33 extending outwardly from that side of the pressure arm 26. The cam 32 is rotated in unison with the anvil roller 16 through a mechanism described below. The contour of the cam 32 is such that during a portion of rotation of the cam, that contour engages the cam follower 33 and retains the remote end of the pressure arm 26 in a raised position irrespective of operation of the air cylinder 28. At that time, the caliper roller 17 remains separated from the anvil roller 16. When the cam 32 rotates to remove the cam contour from the cam follower 33, the remote end of the pressure arm 26 becomes free to move downwardly (as viewed in FIG. 2) in response to force supplied by the air cylinder 28, and that movement pivots the pivot arm 21 to move the caliper roller toward the anvil roller 16.

A measuring arm 37 is located on the side of the pressure arm 26 opposite to the anvil and caliper rollers. The measuring arm 37 is supported for pivoting movement on an axle 38 located approximately mid-way between the ends of the measuring arm. A friction brake 39 is located on one side of the measuring arm 37 in alignment with the axle 38 and acts to retard pivoting movement of the measuring arm unless a predetermined minimum amount of rotational force is applied to that arm. The friction brake, best seen in FIGS. 4 and 7, includes a pair of friction pads 43 at opposite ends of a resilient support 44 made of spring steel or the like and secured by the axial bolt 45. The support 44 urges the friction pads 43 against one side of the measuring arm 37, and tension adjusting screws 44a on either side of the axial bolt 45 allow adjusting the amount of braking effort exerted on the measuring arm by the friction pads.

The measuring arm 37 is connected to the pivot arm 26 by a lost-motion connector for movement only in one direction, in response to the pivot arm. This lost-motion coupling includes a roller 41 pivotably mounted at one end of the support member 40 and positioned to selectively contact the upper side of the measuring arm adjacent the back end 42 thereof. The other end of the support member 40 is attached to the pressure arm 26 so as to move in unison with pivoting movement of the pressure arm. Thus, as the air cylinder 28 pivots the pressure arm 26 upwardly, the pressure arm raises the support member 40 to move the roller 41 away from the measuring arm 37. Likewise, when the pressure arm 26 pivots downwardly, that downward movement is translated through the support member 40 to press the roller 41 against the back end of the measuring arm 37, causing the measuring arm to pivot on its axis 38.

Figure 7:
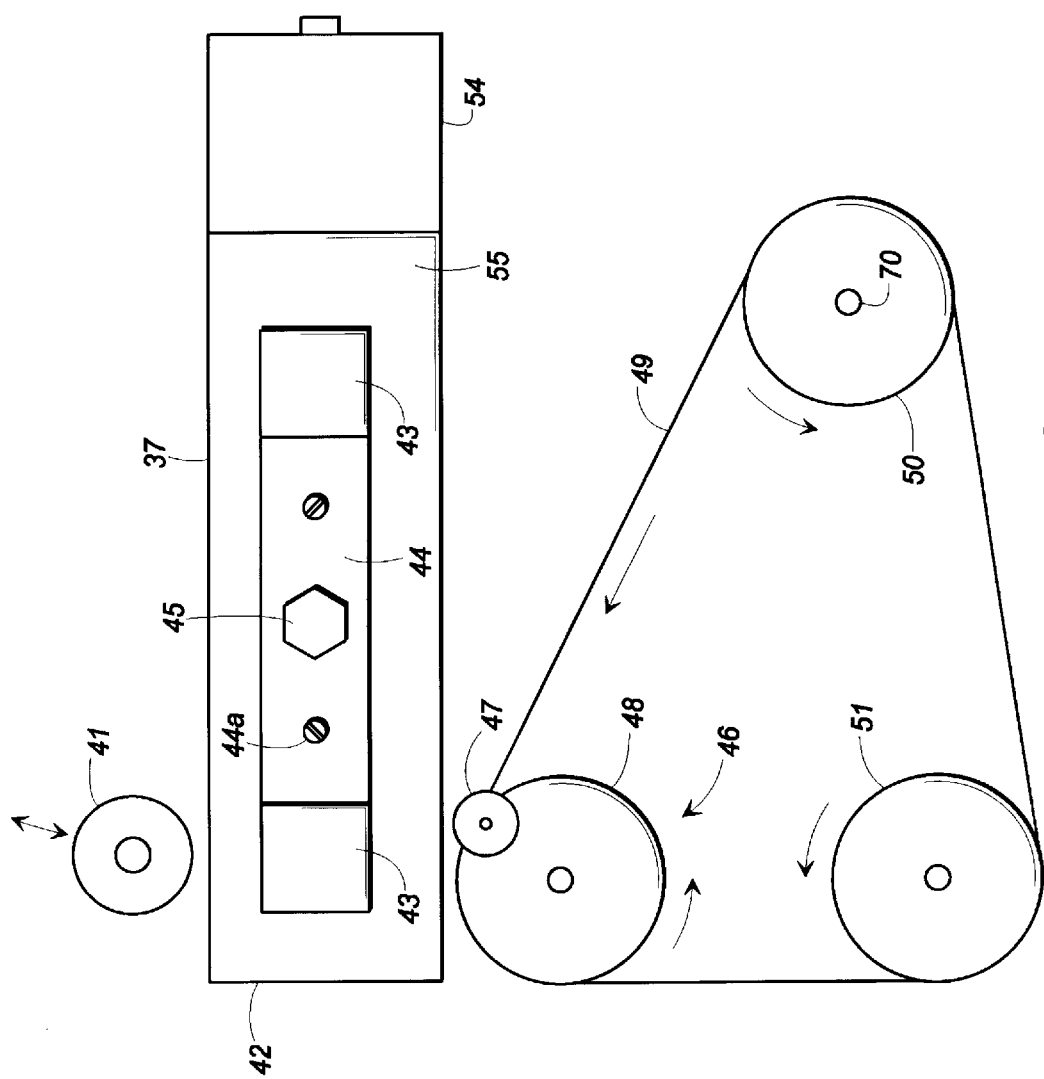
FIG. 7 is a partial elevation view taken along lines 7—7 of FIG. 2.

When the roller 41 is lifted above the back end of the measuring arm 37, the measuring arm is selectably pivoted in the opposite direction in response to the return cam 46 located beneath the back end 42 of the measuring arm. As best seen in FIG. 7, cam 46 comprises a roller 47 eccentrically mounted on one side of a pulley 48. The roller 47 extends beneath the back end of the measuring arm 37 so as to contact the underside of the measuring arm for each rotation of the pulley 48. That pulley is rotated by a drive train including a belt 49 also extending over a reset drive pulley 50 and an idler pulley 51. The belt 49, and at least the reset drive pulley 50 and the roller pulley 48, preferably are toothed or otherwise operative to drive the pulley 48 without slippage, to maintain the proper timing of the return cam 46 as described below.

Figure 8:
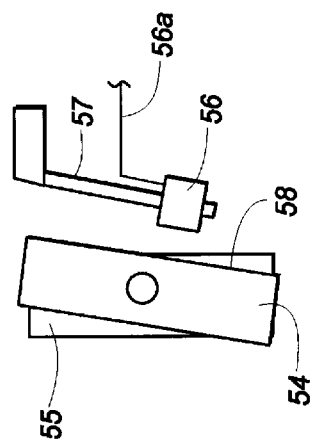
FIG. 8 is a partial elevation view taken along line 8 of FIG. 2, showing the movement sensor associated with the preferred embodiment.

The position of the measuring arm 37 is measured by a sensor including the target block 54 pivotably mounted at the front end 55 of the measuring arm. A position sensor 56 is supported by a bracket 57 (FIGS. 7 and 8) so that the position sensor faces a side surface 58 of the target block 54. As best seen in FIG. 8, the target block 54 is mounted to the measuring arm 37 such that the surface 58 is angularly offset with respect to the vertical plane in which the measuring arm pivots back and forth. The bracket 57 supports the front of the position sensor 56 at a complementary angle to the surface 58, so that the position sensor and the measuring surface are mutually parallel. As the target block 54 moves up or down in response to pivoting movement of the measuring arm 27, the distance between the position sensor 56 and the surface 58 increases or decreases and the position sensor produces an output signal on line 56a corresponding to that spacing. Target block 54 also incrementally moves back and forth relative to the position detector 56 because the front end 55 of the measuring arm 37 moves on an arcuate path centered on the axle 38 of the measuring arm. However, this forward/backward movement of the surface 58 is parallel to the position sensor 56 and that component of movement has no effect on the output of the position sensor.

Figure 4:
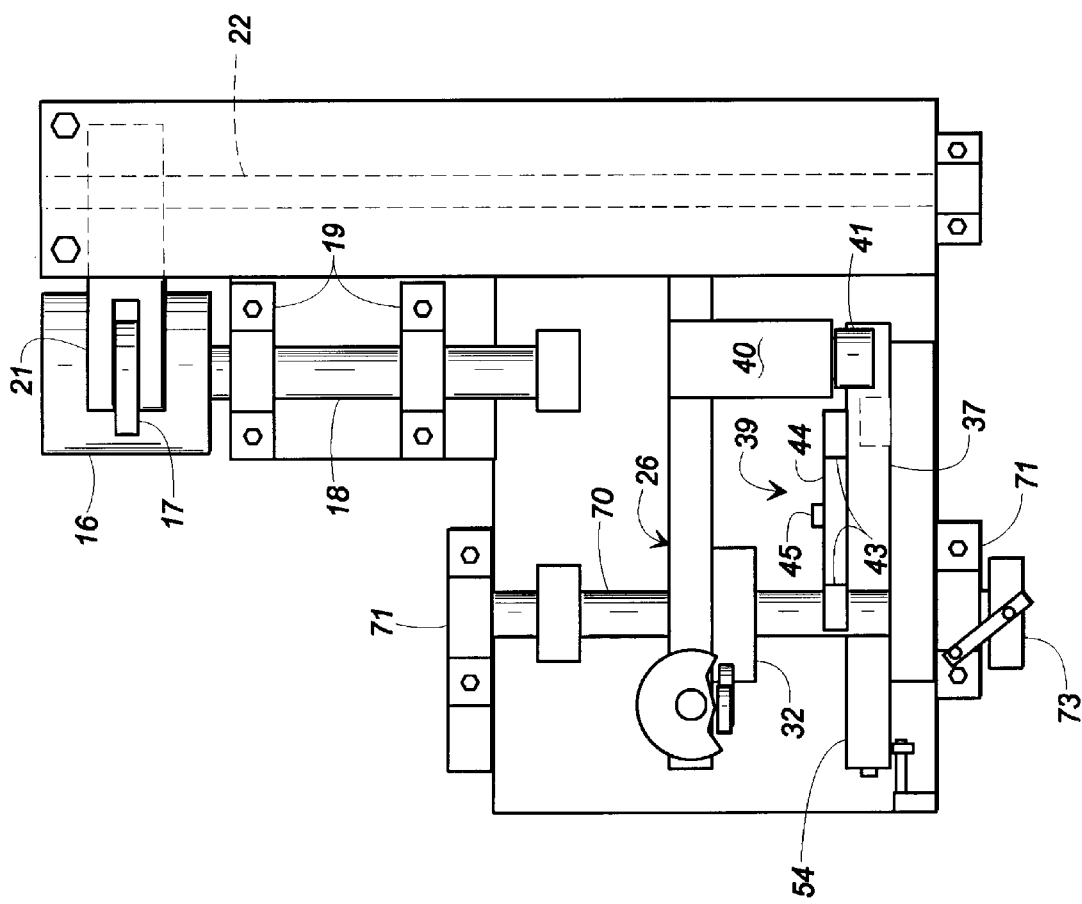
FIG. 4 is a plan view taken along line 4 in FIG. 3.
Figure 6:
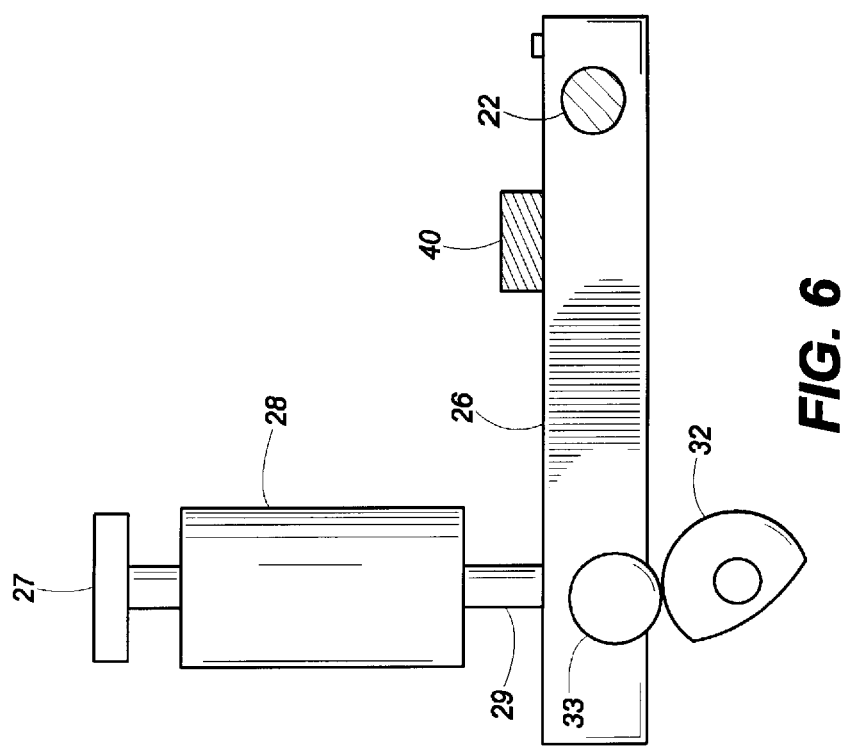
FIG. 6 is a partial section view taken along lines 6—6 of FIG. 2.
Figure 9:
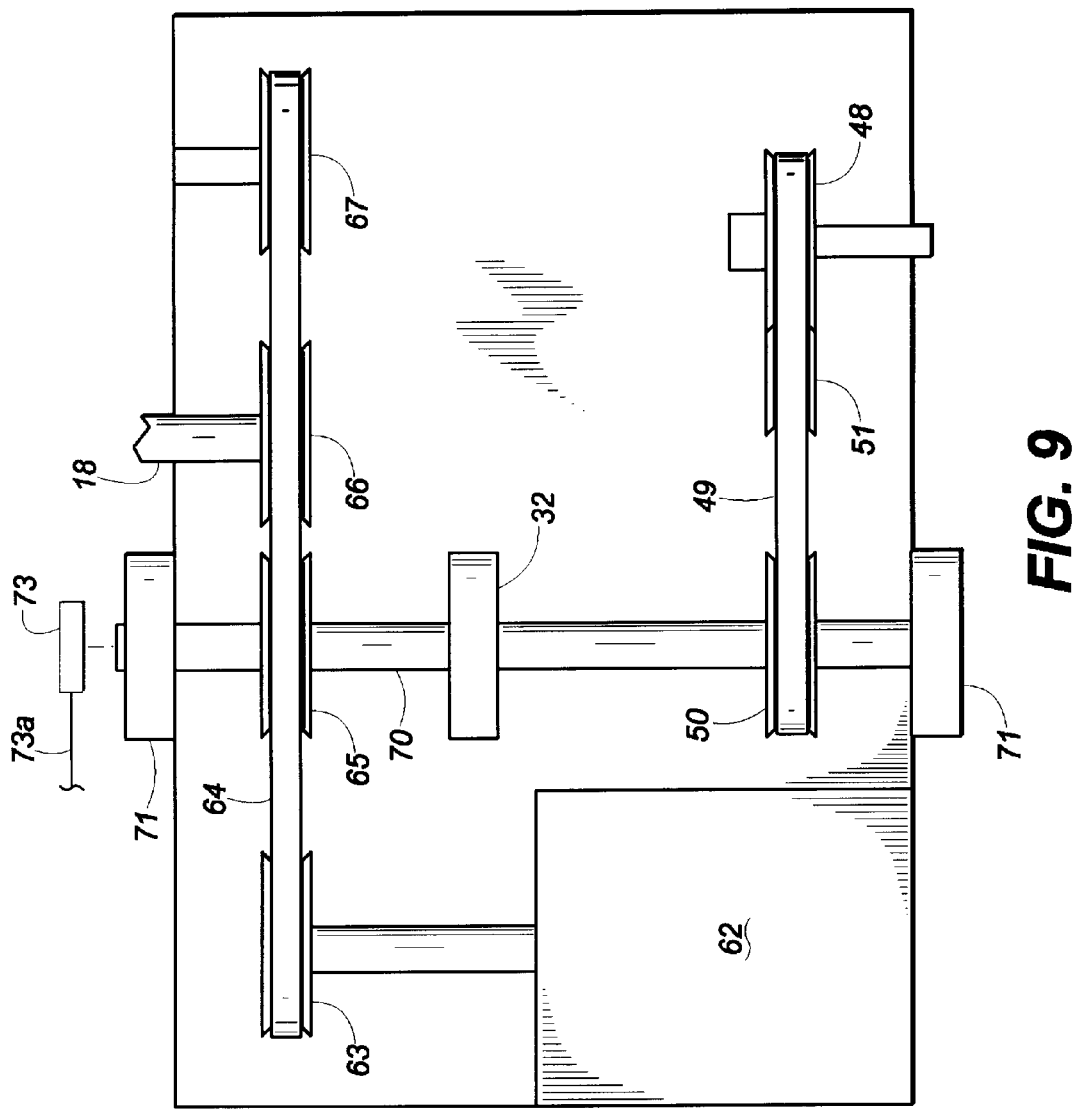
FIG. 9 is a plan view showing the timing drive apparatus for the preferred embodiment.

FIGS. 4 and 9 show details of the mechanical drive apparatus for the disclosed embodiment. Because the operation must be synchronized with movement of the chain conveyor with which the calipering apparatus is used, a gearbox 62 (FIG. 9) is operatively coupled to the chain drive and drives an output pulley 63. That pulley engages a drive belt 64 that drives the cam shaft pulley 65 and the anvil drive pulley 66. The anvil drive pulley 66 is mounted at one end of the drive shaft 18 that supports and rotates the anvil roller 16.

The drive belt 64 also engages an idler pulley 67. The cam shaft drive pulley 65 rotates the cam shaft 70 supported by bearings 71 and mounted below the pressure arm 26 and measuring w arm 37 (FIGS. 2 and 4). The cam shaft 70 drives the cam 32 that selectively engages the cam follower 33 at the remote end of the pressure arm 26. A proximity switch 73 is mounted at one end of the cam shaft 70 and produces a signal on line 73a each time the cam shaft reaches a certain angular position. The purpose of the proximity switch is mentioned below.

The reset drive pulley 50 is mounted on the cam shaft 70 and drives the belt 49 (FIG. 7) connected to the pulley 48 that carries the roller 47 for selectively engaging the back end 42 of the measuring arm 37.

Figure 5:
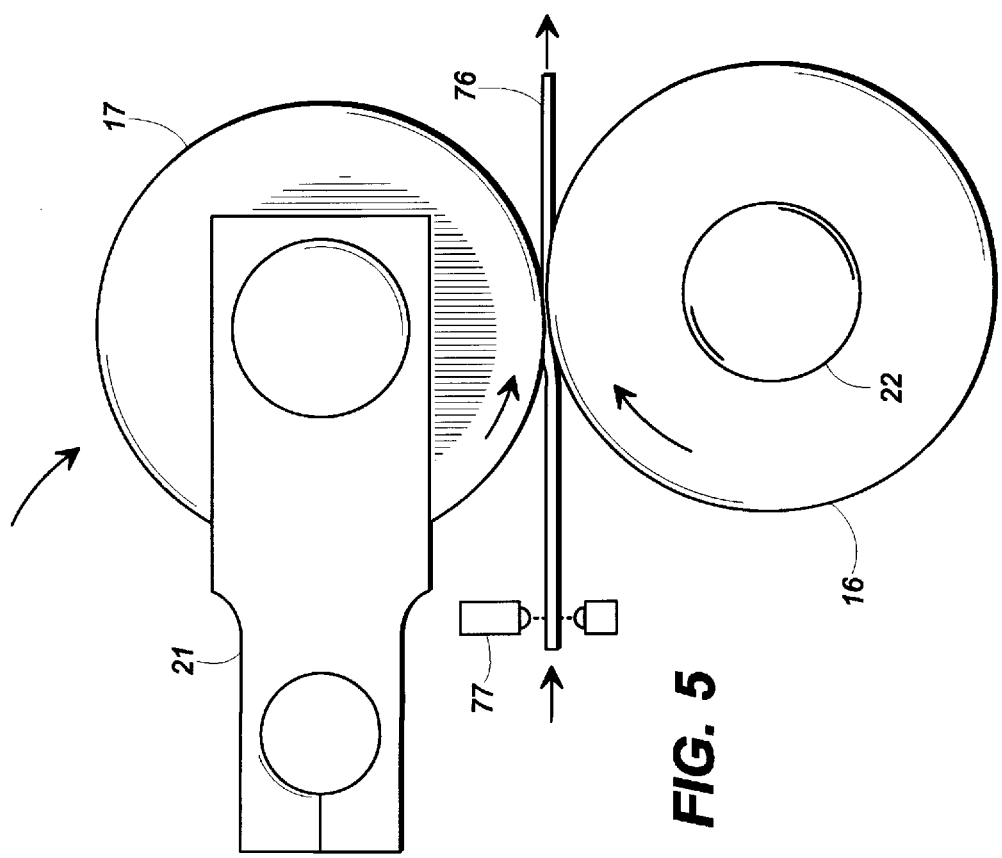
FIG. 5 is a side elevation view illustrating the caliper rollers.

The operation of the disclosed embodiment now is described. For this description it is assumed that the nominal thickness of a particular signature to be calibrated by caliper apparatus is known, although a preferred manner of ascertaining that information is disclosed below. Referring to FIGS. 2 and 5, it is assumed that the air cylinder 28 is initially actuated to withdraw the piston rod 29, thereby moving the caliper roller 17 away from the anvil roller 16. As a particular book or group of signatures 76 (FIG. 5) carried by the chain conveyor (not shown) approaches the caliper rollers, a photoelectric detector 77 (FIG. 5) detects the arriving book and operates the air control valve 30 to reverse air pressure applied to the double-acting cylinder 28. This action vents air from the bottom of the air cylinder and admits pressurized air to the top of the cylinder. However, at this time the cam 32 engages the cam follower 33, preventing the air cylinder 28 from lowering the pressure arm at the remote end of the pressure arm 26 at this time. The caliper roller 17 thus is held apart from the anvil roller 16 as the book 76 moves between those two rollers. Air pressure continues to accumulate in the air cylinder 28, storing energy in the form of compressed air urging the piston rod 29 outwardly against the restraint of the cam 32.

The cam 32 is timed to maintain the caliper roller 17 spaced apart from the anvil roller 16 until the chain conveyor has moved the book 76 between the two rollers. At that time, the low part 32a of the cam moves into alignment with the cam follower 33 on the pressure arm 26, thereby releasing the pressure arm to move in response to the force exerted by the air cylinder 28. The caliper roller 17 thus is forced against the book 76, compressing the book against the anvil roller 16 with an initial impact producing the smallest area of contact on the book, which reduces the variables associated with calipering printed paper. The initial downward force provided by the accumulated air pressure in the air cylinder 28 assists this maximum compression of the book 76 by the caliper roller 17, although the caliper roller will immediately rebound from that maximum penetration due to the resilience of the compressed signature pages constituting the book, as discussed above.

Downward movement of the caliper roller 17 by the pressure arm 26 is coupled to arm 37 by the one-way-motion connection comprising the support member 40 and the roller 41 contacting the back end 42 of the measuring arm 37. This downward movement of the roller 41 pivots the measuring arm about its axle 38, raising the front end 55 of the measuring arm and thereby increasing the distance between the surface 58, on the target block 54, and the position sensor 56. This sensed increase in distance produces a signal corresponding to the maximum penetration of the caliper roller 17 into the book 76.

As the caliper roller 17 rebounds from its initial penetration of the book, the roller 41 carried by the support member 40 moves away from the measuring arm 37. However, the brake 39 maintains the measuring arm at its previous position produced by the maximum downward movement of the caliper roller 17. Frictional force exerted on the measuring arm 37 by the brake 39 also prevents the measuring arm from overshooting the maximum movement during the downward movement imparted by the roller 41. The roller 41 thus functions as a one-way-motion linkage between the pressure arm and the measuring arm 37, connecting to the measuring arm only downward movement of the caliper roller 17 toward the anvil roller 15 but disconnecting the measuring arm from upward rebound movement of the caliper roller. The measuring arm 37 remains in its maximum pivoted position for sufficient time to obtain a distance reading from the position sensor 56. That time is 30 milliseconds in an actual embodiment of the present invention, although that particular time is not considered critical.

The control valve 30 for the air cylinder 28 is reset by a signal from the caliper proximity switch 73, which switches the control valve 30 to the initial condition, returning the caliper roller 17 to the initial position spaced apart from the anvil roller 15 and moving the roller 41 to its initial position spaced above the back end 42 of the measuring arm 37. That movement is timed to occur before the return cam 46 resets the measuring arm 37 by moving the roller 47 upwardly into contact with the back end 42 of the measuring arm 37. The measuring arm thus is reset, and the caliper 15 is prepared to caliper the next book arriving via the chain conveyor.

The signal produced by the position sensor 56 for each calipered book corresponds to the measured thickness of that book. Those skilled in the art will understand that the measurement for each book must be compared to a predetermined thickness for that particular book, to determine whether each individual calipered book contains the requisite number of signatures. Because each book typically is assembled from a group of signatures as previously described, the predetermined thickness of each book is the sum of the thicknesses for the signatures constituting that book. That sum may intentionally vary from pocket to pocket along the chain conveyor, as individual books are customized for specific subscribers as mentioned above. For this reason, the nominal thickness of each signature must be determined before calipering the books according to the apparatus and method of the present invention.

Figure 10:
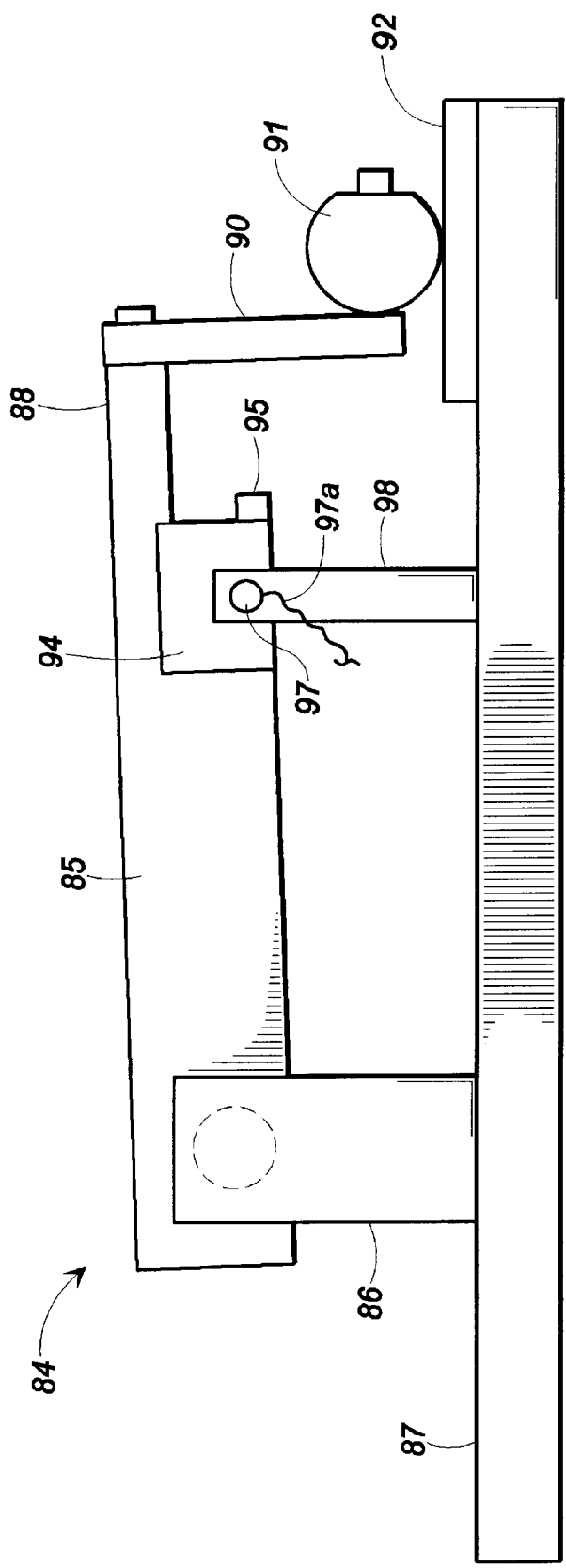
FIG. 10 is a side view of a reference caliper according to a preferred embodiment of the present invention.

FIG. 10 shows a hand caliper indicated generally at 84 for providing measurement signals compatible with the calipering signals produced by the previously-described apparatus and corresponding to the individual thickness of each signature. The hand caliper 84 includes a pivot arm 85 mounted on a bearing supported by a bracket 86 attached to a base plate 87. At the end 88 of the pivot arm remote from the bracket 86, a member 90 extends downwardly from the pivot arm and supports a steel ball 91 the lower surface of which can contact the polished upper surface of the anvil plate 92 supported on the top of the base plate 87.

A polished measuring plate 94 is attached to the pivot arm 85 at a location between the bracket 86 and the ball 91. A bolt 95 secures the measuring plate 94 to the pivot arm at an angle relative to the plane of movement for the pivot arm, and a position sensor 97 is mounted on a support 98 at one side of the arm 95 adjacent the measuring plate. The position sensor 97 is mounted parallel to the measuring plate 94 and produces an output signal corresponding to the distance between the sensor and the measuring plate, along a path perpendicular to the measuring plate. The position sensor 97 and the measuring plate 94 thus function in the same manner as the target block 54 and position detector 56 described above, producing a signal on the line 97a corresponding to the vertical position of the ball 91 and not influenced by the curved path on which the measuring plate 94 moves with the pivot arm 85.

The hand caliper 84 preferably is mounted along the path of the chain conveyor associated with the signature-assembling apparatus. That apparatus typically operates through a computer having memory locations corresponding to each pocket on the chain conveyor, in a manner known to those skilled in the art. A zero setting for both the hand caliper 84 and the active or run caliper 15 is provided by running an empty chain pocket by the respective calipers. This produces a zero reading for both the hand caliper and the run caliper, and the signal corresponding to that spacing is entered into the appropriate memory location either manually by an operator or under computer control.

The operator then starts the chain conveyor and related apparatus to bring to the hand caliper 84 one signature from each active pocket, corresponding to all possible signatures for a particular book production run. Each signature in turn is placed between the anvil plate 92 and the ball 91 of the hand caliper, and the ball is manually lowered on the signature. The thickness of each signature determines the spacing between the ball and the anvil plate, and the position sensor 97 produces corresponding signals that are in turn provided to the memory locations corresponding to the chain pockets carrying those signatures. In this manner, the computer is preloaded with information corresponding to the calipered thickness of each signature available to assemble books in the forthcoming production run.

It will be understood that if the size of a signature changes during a particular printing run, the operator must manually measure the new thickness of that signature and update the signature information on the corresponding memory location of the computer.

During operation of a book production run, the chain conveyor moves each pocket in turn past signatures that selectively feed the individual signatures to the pockets in response to predetermined information about the makeup of the particular book being assembled in that pocket. If a signature is fed to a particular pocket of the chain conveyor, the thickness value for that signature that was stored in the computer during setup is added to a memory location that corresponds to the particular chain pocket. This process of selectively feeding signatures to the pockets, and incrementing the thickness information for that pocket corresponding to the measured thicknesses of the individual signatures, is repeated as the chain conveyor traverses the machine until a complete book is assembled. The chain conveyor next moves that complete book through the run caliper 15 in a manner described above, and the position sensor 56 of the run caliper produces a signal corresponding to the actual thickness of that book. The operating computer then compares that actual thickness with the summed thickness of the individual signatures intended for that book, as compiled in the corresponding location of computer memory. If the actual and intended thickness signals deviate by more than a predetermined amount, the book is deemed defective and is automatically diverted from the remaining production process.

It should be understood that the foregoing relates only to a preferred embodiment of the present invention, and that numerous changes and modifications therein may be made without departing from the spirit and scope of the invention as defined in the following claims.

What is claimed is:

1. A method of calipering a book of signatures to determine the number of pages in the book by measuring the thickness of the book, comprising the steps of:

placing the book between a pair of mutually opposed caliper elements;

urging one of said caliper elements to move toward the other such element so as to compress the book between the caliper elements whereby the moveable caliper element initially reaches maximum compression of the book between the caliper elements as determined by the thickness of the book, and then rebounds from that maximum compression in response to resilience of the book;

using a measuring element to detect the maximum movement of the one caliper element toward the other of said caliper elements before the rebound, said measuring element being nonresponsive to the rebound; and using that maximum movement to produce a signal indicative of the thickness of the book.

2. The method of claim 1, wherein the step of urging the one caliper element comprises:

exerting a force urging the one caliper element toward the other such element while initially restraining such movement; and then terminating the restraint so that the one caliper element moves into sudden compressive engagement with the book so as to produce maximum compression between the caliper elements.

3. The method of claim 2, comprising:

associating the one caliper element with a support element that moves in a first direction along a path as the one caliper element moves toward the other caliper element to compress the book and then moves in a return direction along said path as the first caliper element rebounds from the other caliper element;

coupling the support element through a one-way drive to the measuring element so that the measuring element moves in response to the movement of the support element in the first direction but not in response to rebound movement in the return direction, so that the travel of the measuring element in the first direction corresponds to the thickness of the book being calipered; and sensing the movement of the measuring element in the first direction to determine the maximum extent of movement of the one caliper element.

4. The method of claim 3, further comprising:

restoring the measuring element to a predetermined starting position after sensing the movement in the first direction, so that the measuring element is ready to measure the thickness of another book between the caliper elements.

5. Apparatus for sensing the thickness of a book comprising a group of signatures to determine whether the book contains a predetermined number of pages, comprising:

a pair of mutually opposed caliper elements between which the book may be inserted, one of the caliper elements being moveable relative to the other such element;

an element selectively urging the one caliper element toward the other such element so that the one caliper element initially compresses the book between the caliper elements at a maximum compression corresponding to the actual pages making up the book, and then rebounds from that maximum compression in response to resilience of the book; and a sensing element responsive to the movement of the one caliper element toward the other caliper element before the rebound and nonresponsive to the rebound movement, the sensing element operative to produce a signal indicative of the maximum movement toward the other caliper element, whereby the signal indicates the thickness of the book.

6. Apparatus as in claim 5, wherein the element selectively urging the one caliper element comprises:

a motive element selectively operative to urge the one caliper element toward the other caliper element; and means operative to restrain the one caliper element from compressing the book until a predetermined time after the motive element commences urging the one caliper element.

7. Apparatus as in claim 6, where in:

the motive element comprises a pneumatic element operative in response to selectively applied air pressure to urge the one caliper element toward the other caliper element; and the restraining means comprises a stop element selectively operative to block said movement of the one caliper element, so that air pressure accumulates in the pneumatic element while the caliper element is blocked, thereby increasing the force applied to urge the one caliper element.

8. Apparatus as in claim 6, in which books arrive at the apparatus in sequence, wherein:

the motive element comprises an air cylinder selectively operative to urge the one caliper element in closing movement toward the other caliper element and in a reverse mode to move the one caliper element away from the other caliper element, and further comprising;

means responsive to arrival of a book in predetermined relation to the caliper elements to apply air pressure to the air cylinder so as to urge the one caliper element to close toward the other caliper element; and the restraining means is operative to prevent closing movement of the one caliper element after the air cylinder commences urging the closing movement of the one caliper element until the arriving book is at a predetermined location between the caliper elements, whereupon air pressure accumulates within the air cylinder to drive the one caliper element in closing movement for maximum compression of the book when the restraining means ceases blocking the movement of the one caliper member.

9. Apparatus as in claim 8, wherein:

the restraining means comprises a cam operative in response to the position of an arriving book to prevent the one caliper element from closing movement until the arriving book reaches the predetermined location.

10. Apparatus as in claim 8, wherein:

the air cylinder is operative in a reverse mode to move the one caliper element away from the other caliper element in response to travel of the arriving book a predetermined amount beyond the predetermined location whereat the closing movement occurred, so that the caliper elements become reset for the arrival of another book.

11. Apparatus as in claim 5, further comprising:

a lost-motion connection operatively associated with the one caliper element and the sensing element so as to drive the sensing element from an initial setting in response to the movement of the one caliper element toward the other caliper element, and to decouple the sensing element from the one caliper element during the rebound movement; and means responsive to the sensing element to produce a signal corresponding to the maximum extent of movement of the one caliper element toward the other caliper element.

12. Apparatus as in claim 11, further comprising:

means operative to restore the sensing element to the initial setting in response to completion of calipering, so that the sensing element is ready to sense movement of the one caliper element relative to another book.

13. Apparatus as in claim 11, further comprising:

a measuring arm mounted for movement along a predetermined path;

a member operatively associated with the one caliper element and operative to move the measuring arm from an initial position only in response to movement of the one caliper element toward the other caliper element;

the sensor element being moveable with the measuring arm; and means selectively operative to return the measuring arm to the initial position.

* * * * *